(12) United States Patent
Chen et al.

(10) Patent No.: US 12,197,292 B2
(45) Date of Patent: *Jan. 14, 2025

(54) TIERED CLOUD STORAGE FOR DIFFERENT AVAILABILITY AND PERFORMANCE REQUIREMENTS

(71) Applicant: Red Hat, Inc., Raleigh, NC (US)

(72) Inventors: Huamin Chen, Westford, MA (US); Jay Vyas, Boston, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/215,593

(22) Filed: Jun. 28, 2023

(65) Prior Publication Data

US 2023/0333942 A1 Oct. 19, 2023

Related U.S. Application Data

(63) Continuation of application No. 17/019,779, filed on Sep. 14, 2020, now Pat. No. 11,734,125, which is a
(Continued)

(51) Int. Cl.
*G06F 16/00* (2019.01)
*G06F 11/14* (2006.01)
*G06F 16/182* (2019.01)
*G06F 16/215* (2019.01)
*H04L 67/025* (2022.01)
(Continued)

(52) U.S. Cl.
CPC ........ *G06F 11/1464* (2013.01); *G06F 16/182* (2019.01); *G06F 16/215* (2019.01); *H04L 67/025* (2013.01); *H04L 67/10* (2013.01); *H04L 67/1095* (2013.01); *H04L 67/561* (2022.05);
(Continued)

(58) Field of Classification Search
None
See application file for complete search history.

(56) References Cited

U.S. PATENT DOCUMENTS 5,528,508 A 6/1996 Russell et al.
6,003,047 A * 12/1999 Osmond ................. H04L 41/22
715/866
(Continued)

FOREIGN PATENT DOCUMENTS

WO 2015/134678 A1 9/2015

OTHER PUBLICATIONS

Hildebrand et al., File Systems and Storage on Making GPFS Truly General, usenix.org, Jun. 2015, vol. 40, No. 3 (6 pages).
(Continued)

*Primary Examiner* — Tuankhanh D Phan
(74) *Attorney, Agent, or Firm* — Kilpatrick Townsend & Stockton LLP

(57) ABSTRACT

A system and method for a tiered cloud storage for different availability and performance requirements includes a gateway, a block store configured to cache data, and an object store configured to persistently store data. The gateway, the block store, and the object store are in a compute zone. The gateway may receive from a user application a file access call and process the file access call. The gateway may also send the file access call to the block store. Then, the gateway may determine to store data in the object store and flush the data from the block store to the object store.

20 Claims, 6 Drawing Sheets

Related U.S. Application Data continuation of application No. 15/240,645, filed on Aug. 18, 2016, now Pat. No. 10,776,216.

(51) Int. Cl.
  *H04L 67/10* (2022.01)
  *H04L 67/1095* (2022.01)
  *H04L 67/561* (2022.01)
  *H04L 67/565* (2022.01)
  *G06F 11/20* (2006.01)

(52) U.S. Cl.
  CPC ........ *H04L 67/565* (2022.05); *G06F 11/2094* (2013.01); *G06F 11/2097* (2013.01)

(56) References Cited

U.S. PATENT DOCUMENTS

| | | |
|---|---|---|
| 8,793,531 B2 | 7/2014 | George et al. |
| 9,213,717 B1 * | 12/2015 | Pawar ................. G06F 16/1774 |
| 2014/0101298 A1 | 4/2014 | Shukla et al. |
| 2014/0304475 A1 * | 10/2014 | Ramanujan ........... G06F 1/3275 |
| | | 711/135 |
| 2015/0067086 A1 * | 3/2015 | Adriaens ............... G06F 15/167 |
| | | 709/212 |

OTHER PUBLICATIONS

Oracle® Cloud, Using Oracle Storage Cloud Service, Jun. 2016, Documentation for Oracle Storage Cloud Service administrators and users that describes how to store and manage content in the cloud (120 pages).

* cited by examiner

TIERED CLOUD STORAGE FOR DIFFERENT AVAILABILITY AND PERFORMANCE REQUIREMENTS

CROSS REFERENCES TO RELATED APPLICATIONS

The present application is a continuation of application Ser. No. 17/019,779 filed on Sep. 14, 2020, which is a continuation of application Ser. No. 15/240,645 filed on Aug. 18, 2016, which issued on Sep. 15, 2020 as U.S. Pat. No. 10,776,216, the entire content of each of which is hereby incorporated by reference herein.

BACKGROUND

Cloud computing defines a model for enabling ubiquitous, convenient, on-demand network access to a shared pool of configurable computing resources (e.g., networks, servers, storage, applications, and services) that can be rapidly provisioned and released with minimal management effort or service provider interaction. Essential characteristics of the cloud computing model include on-demand self-service, broad network access, resource pooling, rapid elasticity, and measured service. The cloud computing model includes several service models, including Software as a Service (SaaS), Platform as a Service (PaaS), and Infrastructure as a Service (IaaS). The cloud computing model may be implemented according to one of the several deployment models, including private cloud, community cloud, public cloud, and hybrid cloud.

Cloud infrastructure is a collection of hardware and software that implements the cloud computing model. Cloud infrastructure may be viewed as including a physical layer and an abstraction layer. The physical layer may include hardware resources designed to support the cloud services being provided, and typically includes server, storage, and network components. The abstraction layer may include the software deployed across the physical layer, which manifests the essential cloud characteristics. Conceptually, the abstraction layer resides above the physical layer. One type of IaaS is cloud storage. Cloud storage is a data storage service that provides storage to users in the form of a virtualized storage device over a network. Using cloud storage service, users may store, retrieve, maintain, and back up data remotely.

SUMMARY

The present disclosure provides new and innovative methods and systems for a tiered cloud storage. An example method includes receiving, by a first gateway in a first compute zone, from a user application a file access call and processing, by the first gateway, the file access call. The method also includes sending, by the first gateway, the file access call to a first block store that is configured to cache data. The method further includes determining, by the first gateway, to store first data in a first object store that is configured to persistently store data and flush the first data from the first block store to the first object store.

An example system includes a first gateway, a first block store configured to cache data, and a first object store configured to persistently store data. The first gateway, the first block store, and the first object store may be in a first compute zone. The first gateway may receive from a user application a file access call and process the file access call. The first gateway may also send the file access call to the first block store and determine to store first data in the first object store and flush the first data from the first block store to the first object store.

Additional features and advantages of the disclosed methods and system are described in, and will be apparent from, the following Detailed Description and the Figures.

DETAILED DESCRIPTION OF EXAMPLE EMBODIMENTS

Figure 1:
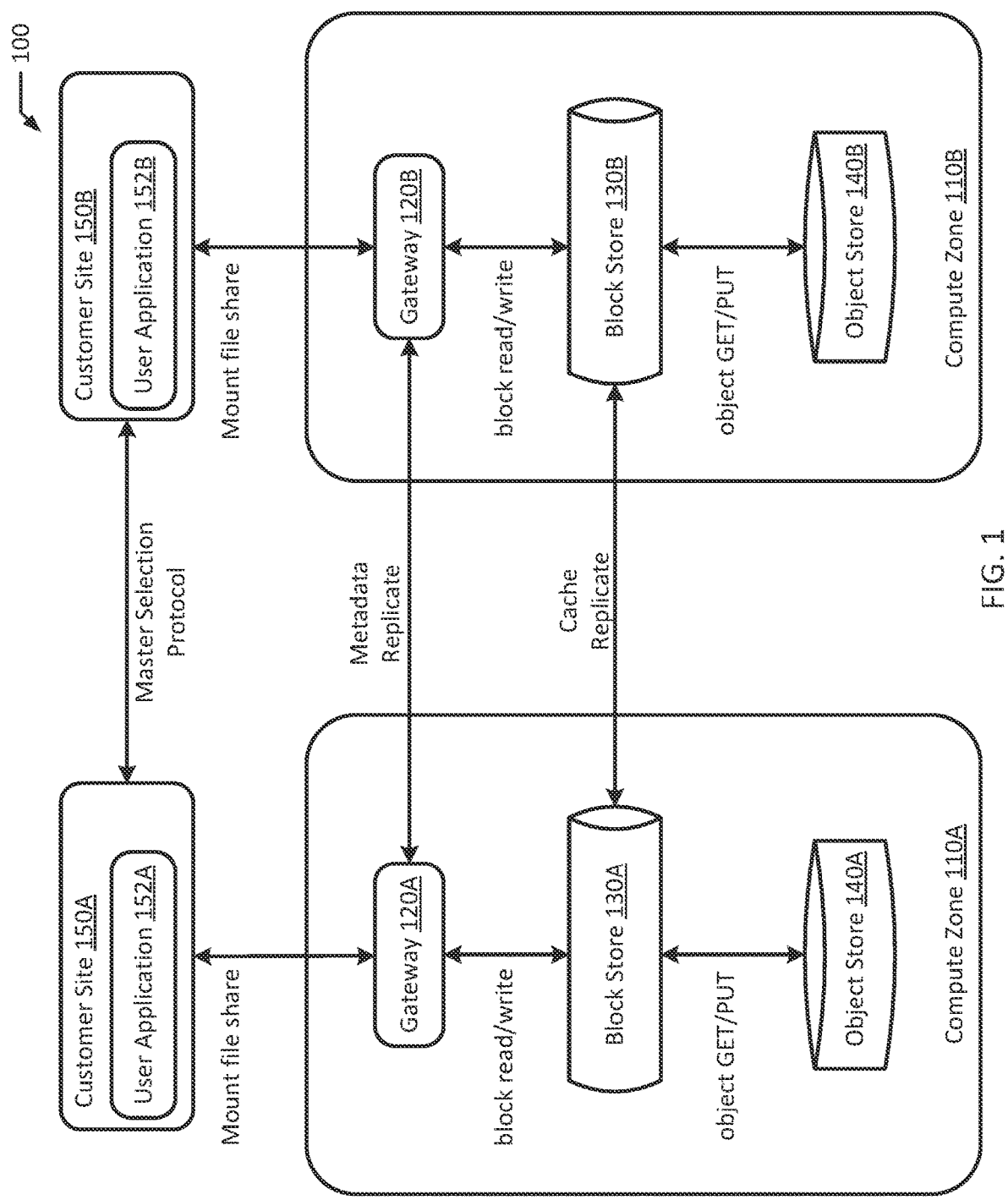
FIG. 1 is a block diagram of an example tiered cloud storage system according to an example of the present disclosure.

Described herein are methods and systems for a tiered cloud storage for different availability and performance requirements. Object store is a type of data storage where data is stored in objects. Generally, objects are stored in a flat structure, where objects are not organized in a hierarchy and one object is not stored in another object. Typically, each object includes the data to be stored in the object, various metadata, and a globally unique identifier within the object storage system. Object storage is cheaper, but slower than block storage. Block storage in cloud services emulates the storage of a traditional block device, such as a physical hard drive, using a file system applied on top of the block storage to map data onto blocks. Due to the performance and consistency limitations, existing and legacy enterprise applications usually do not use object store. Existing solutions that emulate object store to file store generally do not perform well and have low scalability.

Aspects of the present disclosure may address the above noted deficiency by providing a tiered cloud storage for different availability and performance requirements. Some cloud storage providers have provided tiered cloud storage services and cloud users may choose the appropriate storage tier based on capacity, speed, and price. Tiered storage refers to the assignment of different types of data to different types of storage media. Aspects of the present disclosure may provide new and innovative methods and systems for a tiered cloud storage based on a different data consistency model. In an example, a tiered cloud storage system may combine both fast yet expensive block store and slower but less expensive object store. The system may include a gateway (or a controller), a block store, and an object store in a compute (or cloud) zone. When the gateway receives a write access call for data from a user application, the gateway may send the write access call to the block store and determine whether to store the data in block store and whether to flush the data to the object store.

Metadata used by the gateway is replicated to other gateways across different compute zones. Cached data blocks in the block store are also replicated to other block stores across compute zones. Frequencies of the replication of the data cache and the metadata may be determined heuristically. For example, if a cloud user prioritizes both data consistency and data loss rather than cost efficiency, both the metadata and data cache are replicated synchronously. If a cloud user prioritizes data consistency rather than data loss, only the metadata is replicated synchronously, and the data cache is replicated asynchronously. If a cloud user prioritizes cost efficiency rather than data consistency and data loss, both the data cache and metadata are replicated asynchronously. In this way, cloud users can choose the appropriate frequencies based on price, data consistency, or data loss. Therefore, aspects of the present disclosure may offer a consistency and high availability model that can be tailored to the needs of a particular user and be highly scalable.

FIG. 1 depicts a high-level component diagram of an example tiered cloud storage system 100 for different availability and performance requirements. In an example, the system 100 may be a Portable Operating System Interface (POSIX) compliant filesystem. The system 100 may include one or more compute zones 110A-B. As used herein, a compute zone may refer to a separate cloud region. The cloud region may be a geographical region where certain compute resources are located. Each compute zone 110A-B may include a gateway 120A-B, a block store 130A-B, and an object store 140A-B. In an example, the gateway may be a POSIX layer. The gateway 120A-B may act as a bridge between user applications and remote cloud storage. The block store 130A-B may be a block storage device, which is a type of data storage where data is stored in blocks. The gateway 120A-B may be communicatively coupled to the block store 130A-B. In an example, the block store 130A-B may be configured to cache data. The gateway 120A-B may read or write cached data blocks in the block store 130A-B. The block store 130A-B may be communicatively coupled to the object store 140A-B. In an example, the object store 140A-B may be configured to persistently store data. The block store 130A-B may transfer data to or from the object store 140A-B. For example, data may be transferred to or from the object store 140A-B by executing "GET" or "PUT" operations.

The system 100 may include one or more customer sites 150A-B. As used herein, customer sites 150A-B may refer to geographical regions. Each customer site 150A-B may be associated with one or more compute zones 110A-B. For example, the customer site 150A and the compute zone 110A may be in the same geographic region A (e.g., in Boston), and the customer site 150B and the compute zone 110B may be in the same geographic region B (e.g., in Chicago). Using a Master Selection Protocol, one or more customer sites are selected as the primary site and the remaining customer sites become backups. In an example, it may depend on the location of the cloud user. For example, if a cloud user A is located in region A, in which a customer site 150A and a compute zone 110A are located, the customer site 150A is acting as primary to the cloud user A and the remaining customer sites (e.g., 150B) are acting as backups. If a cloud user B is located in region B, in which a customer site 150B and a compute zone 110B are located, the customer site 150B is acting as primary to the cloud user B and the remaining customer sites (e.g., 150A) are acting as backups. Each customer site may include one or more user applications 152A-B. Each customer site 150A-B may be communicatively coupled to a gateway 120A-B in a compute zone 110A-B associated with the customer site 150A-B. In an example, cloud users may need to mount a file share to have access to the filesystem.

In an example, the customer sites may include a plurality of primary sites and a plurality of backup sites. In an example, only the primary site(s) may be enabled to fully read and write to the block store and object store in a compute zone associated with the primary site(s). The backup site(s) may be enabled to only read the block store and object store in a compute zone associated with the backup site(s).

In an example, metadata used by the gateway 120A may be replicated to other gateways 120B across different compute zones. In an example, the metadata may be information regarding which data is stored in the block store and which data is flushed to the object store and stored in the object store. In another example, the metadata may include any information related to the data stored in the filesystem, such as author, file size, date created, date last accessed, and date last modified. Cached data in the block store 130A may also be replicated to other block stores (e.g., 130B) across compute zones. Frequencies of the replication of the data cache and the metadata may be determined heuristically. Examples of the determination processes are described in greater detail below and as shown in FIG. 2.

Figure 2:
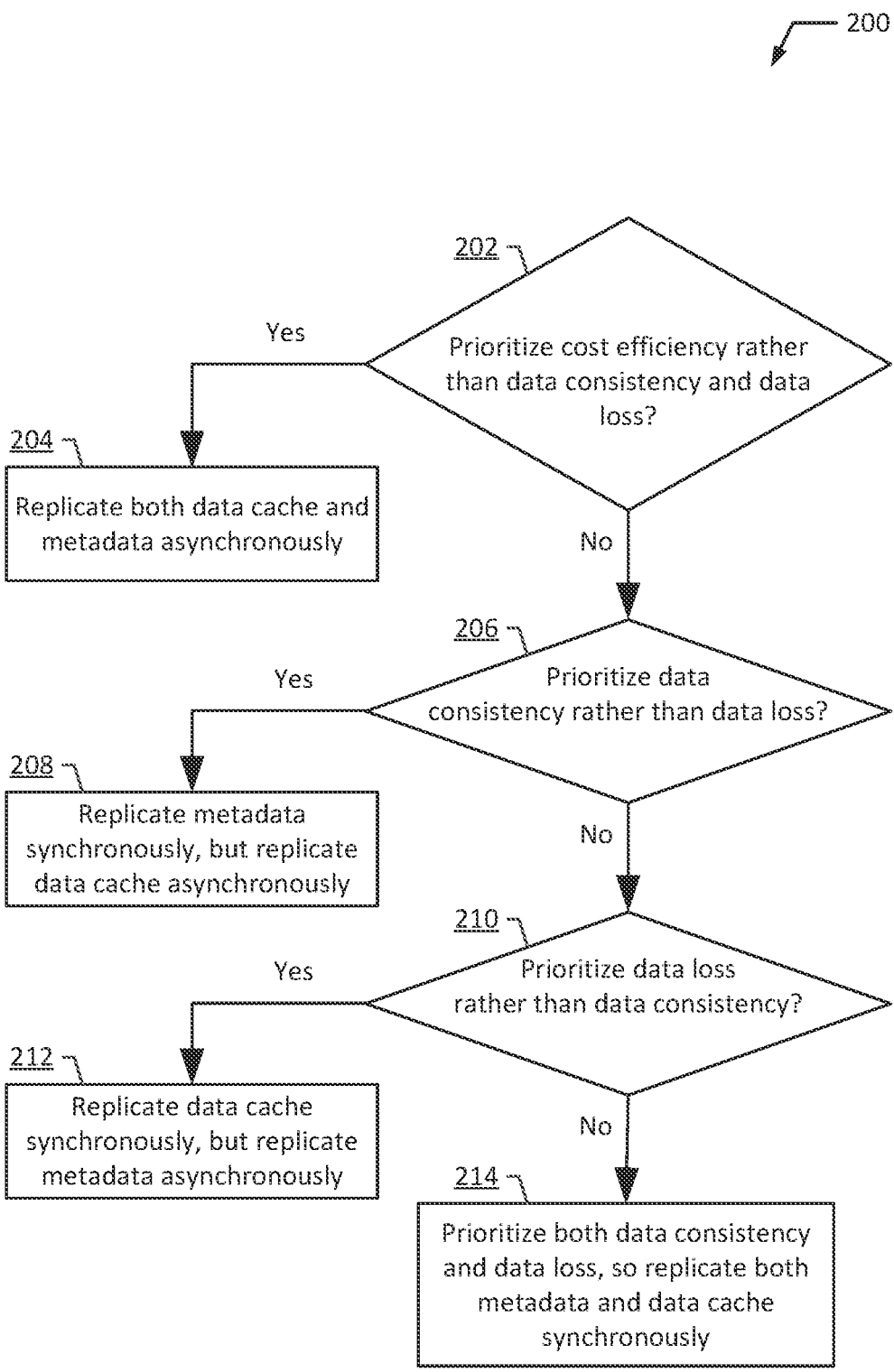
FIG. 2 a flowchart illustrating an example method of determining frequencies of the replication of data cache and metadata.

FIG. 2 shows a flowchart of an example method of determining frequencies of the replication of data cache and metadata. Although the example method 200 is described with reference to the flowchart illustrated in FIG. 2, it will be appreciated that many other methods of performing the acts associated with the method may be used. For example, the order of some of the blocks may be changed, certain blocks may be combined with other blocks, and some of the blocks described are optional.

In the illustrated example, the method 200 may include a step of determining whether a cloud user prioritizes cost efficiency rather than data consistency and data loss (block 202). For example, a user administrator of a customer site 150A-B may set priorities and costs based on system needs. If the user is more concerned about cost efficient cloud storage service rather than data consistency and data loss, both data cache and metadata may be replicated asynchronously across the compute zones (block 204). For example, the data cache in the block store 130A and the metadata in the gateway 120A may be replicated to the block store 130B and the gateway 120B asynchronously. If the user does not prioritize cost efficiency over data consistency and data loss, the method 200 may include determining whether the user prioritizes data consistency rather than data loss (block 206). If the user is more concerned about data consistency rather than data loss, the metadata may be replicated synchronously, but the data cache may be replicated asynchronously across compute zones (block 208). For example, the metadata in the gateway 120A may be replicated to the gateway 120B synchronously, but the data cache in the block store 130A may be replicated to the block store 130B asynchronously.

If the user does not prioritize data consistency over data loss, the method 200 may include determining whether the cloud user prioritizes data loss rather than data consistency (block 210). If the user is more concerned about data loss rather than data consistency, the cache data may be replicated synchronously, but the metadata may be replicated asynchronously across compute zones (block 212). For example, the data cache in the block store 130A may be replicated to the block store 130B synchronously, but the metadata in the gateway 120A may be replicated to the gateway 120B asynchronously. If the cloud user prioritizes both data consistency and data loss, both the metadata and the data cache may be replicated synchronously (block 214). For example, the data cache in the block store 130A and the metadata in the gateway 120A may be replicated to the block store 130B and the gateway 120B synchronously.

As used herein, replicating data synchronously may involve replicating data at substantially the same time that the data is created or updated. As used herein, replicating data asynchronously may involve not replicating the data at the same time that the data is created or updated. In this case, data may be replicated periodically. For example, the data may be replicated every minute, every 5 minutes, every 10 minutes, or every hour.

Figure 3:
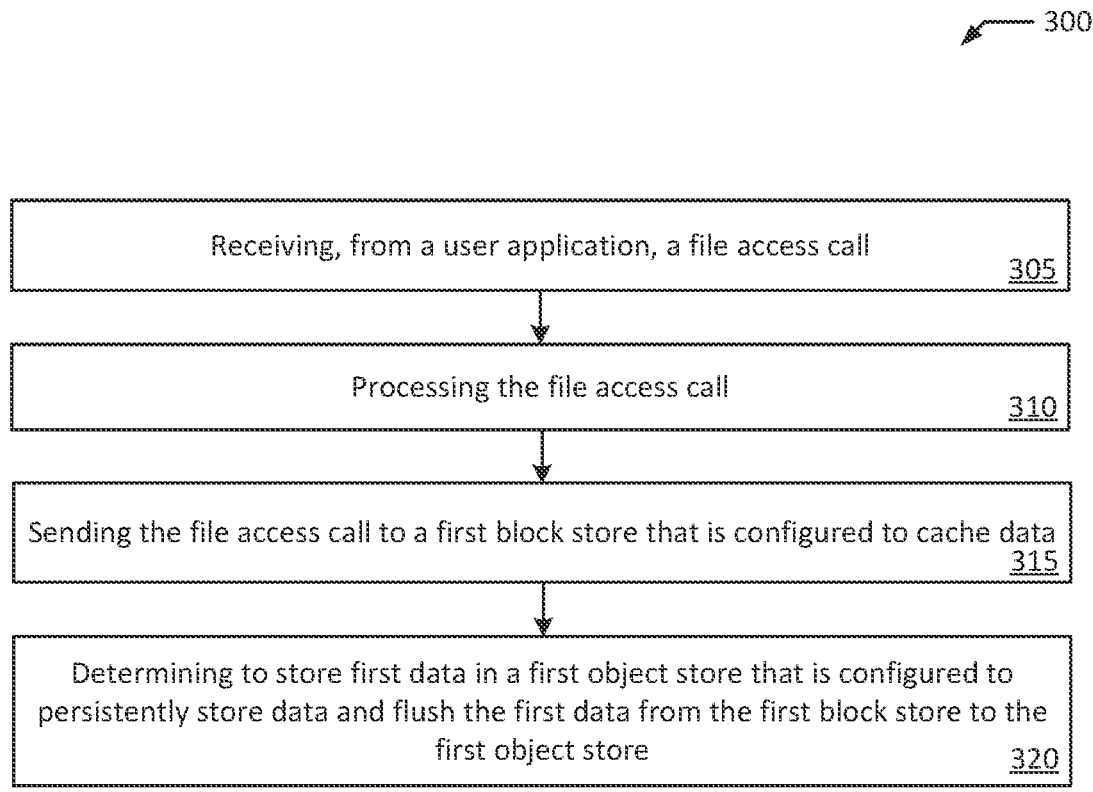
FIG. 3 is a flowchart illustrating an example method of operating a tiered cloud storage according to an example of the present disclosure.

FIG. 3 shows a flowchart of an example method of operating a tiered cloud storage according to an example of the present disclosure. Although the example method 300 is described with reference to the flowchart illustrated in FIG. 3, it will be appreciated that many other methods of performing the acts associated with the method may be used. For example, the order of some of the blocks may be changed, certain blocks may be combined with other blocks, and some of the blocks described are optional.

In the illustrated example, a gateway may receive, from a user application, a file access call (block 305). For example, the gateway 120A may receive, from a user application 152A, a file access call. Examples of the file access call may include a write access call and a read access call. The gateway may process the file access call (block 310). In an example, the gateway 120A may map the file access call to block access. Then, the gateway may send the file access call to a block store that is configured to cache data (block 315). For example, the gateway 120A may send the file access call to a block store 130A. Then, the gateway may determine to store first data in an object store that is configured to persistently store data and flush the first data from the block store to the object store (block 320). For example, the file access call received from the user application 152A was a write access call to store first data, and the gateway 120A may determine to store the first data in an object store 140A that is configured to persistently store data and flush the first data from the block store 130A to the object store 140A.

Figure 4A:
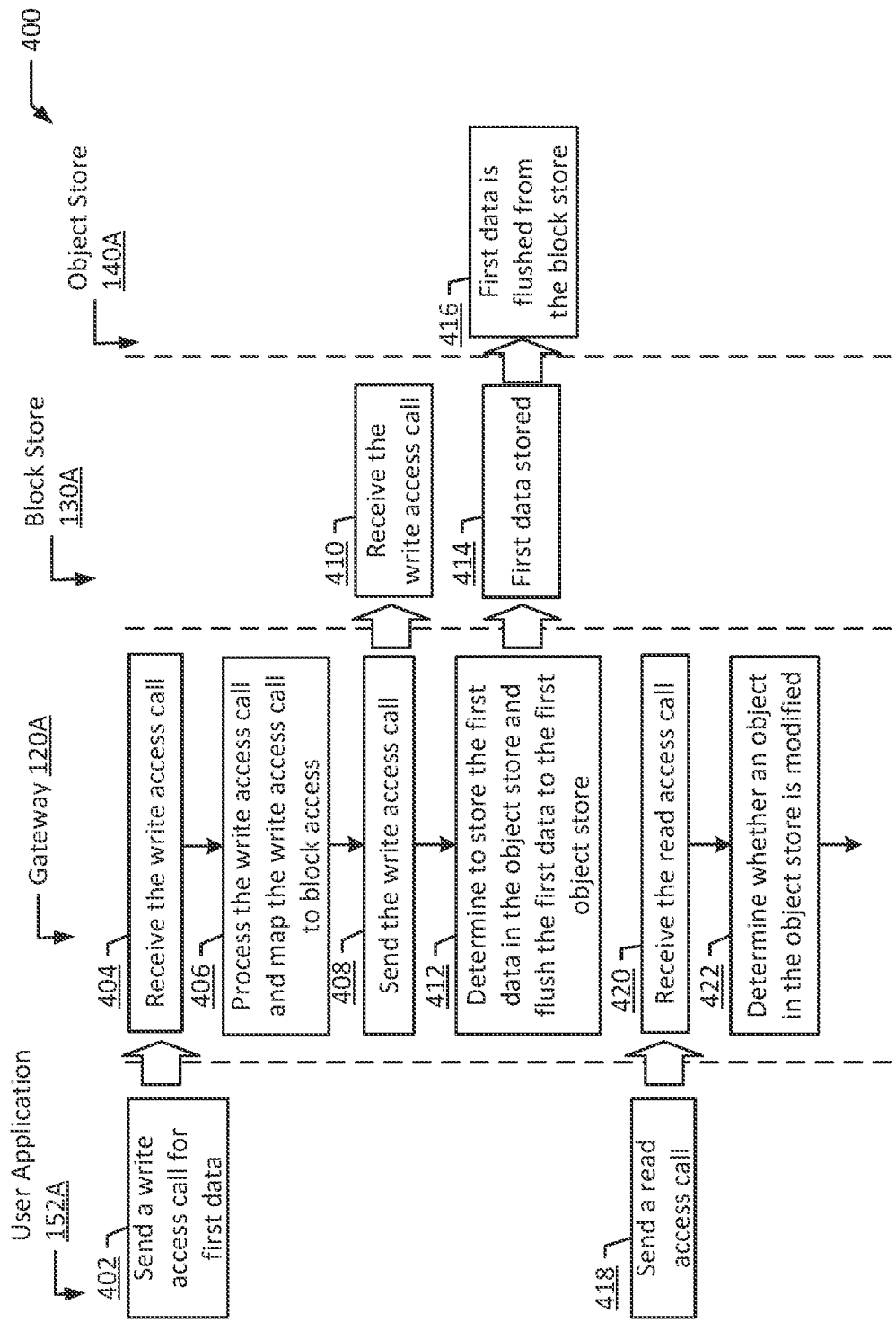
FIGS. 4A and 4B are flow diagrams illustrating example methods of operating a tiered cloud storage according to examples of the present disclosure.
Figure 4B:
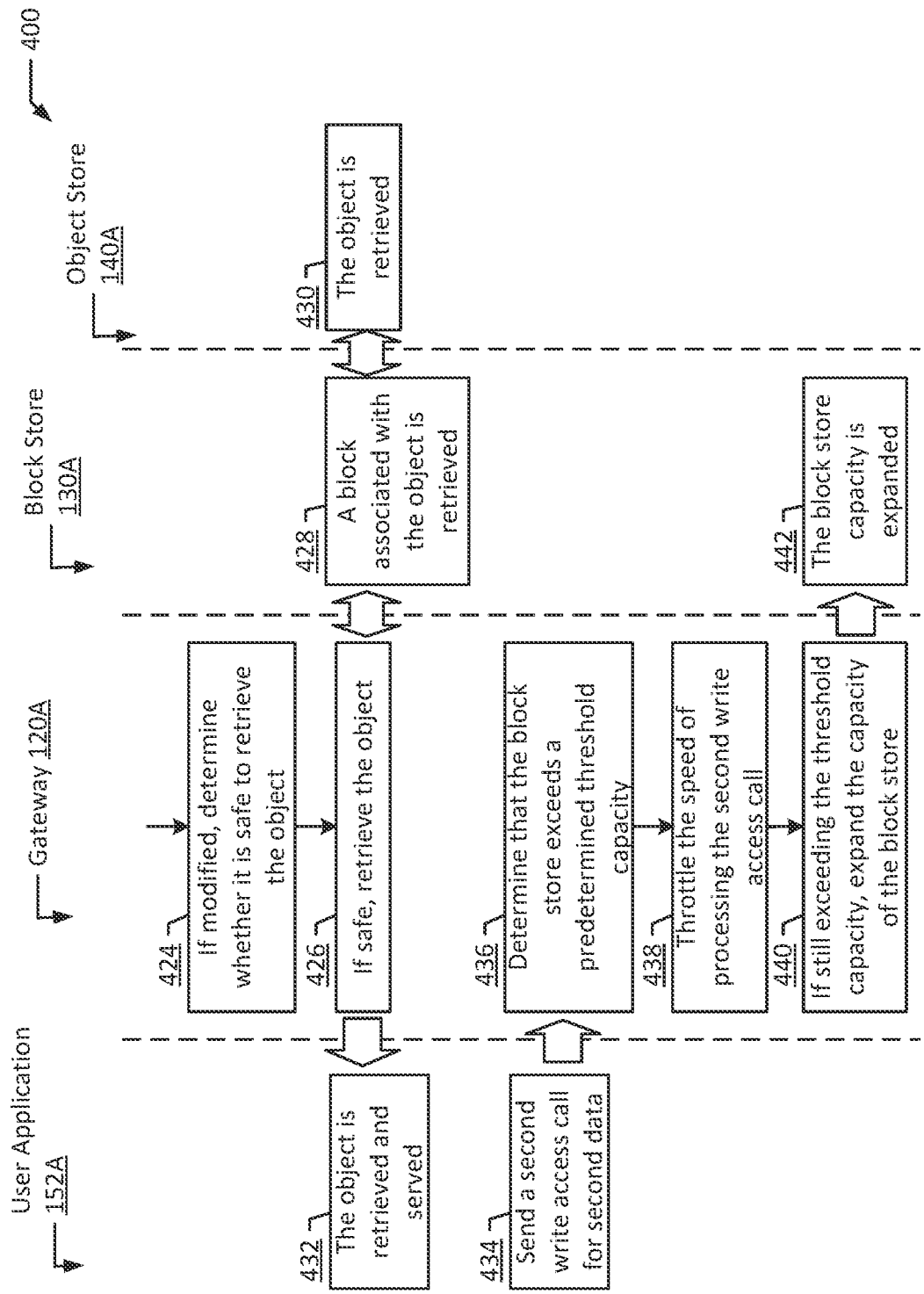

FIG. 4 shows a flowchart of an example method 400 for a tiered cloud storage according to an example of the present disclosure. Although the example method 400 is described with reference to the flowchart illustrated in FIG. 4, it will be appreciated that many other methods of performing the acts associated with the method may be used. For example, the order of some of the blocks may be changed, certain blocks may be combined with other blocks, and some of the blocks described are optional.

In the illustrated example, a user application may send a write access call for first data to a gateway (block 402). For example, the user application 152A may send a write access call to store first data to the gateway 120A. The gateway may receive the write access call (block 404). For example, the write access call may be writing text in a document in user application 152A. Then, the gateway may process the write access call and map the write access call to block access (block 406). In an example, the gateway 120A may determine whether to store the first data only in a block store 130A or whether to flush the first data to an object store 140A and store it in the object store 140A. Then, the gateway may send the write access call to a block store (block 408) and the block store may receive the write access call (block 410). For example, the gateway 120A may send the write access call to a block store 130A and the block store 130A may receive the write access call. The block store 130A may be configured to cache data and act as data landing zone. In an example, the gateway may determine to store the first data in an object store and flush the first data to the object store (block 412). For example, the gateway 120A may determine to store the first data in an object store 140A and flush the first data to the object store 140A. The object store 140A may be configured to persistently store data. The block store may store the first data (block 414) and flush the first data to the object store (block 416). For example, the block store 130A may store the first data and flush the first data to the object store 140A. In another example, the gateway 120A may determine to store the first data only in the block store 130A. Then, the block store 130A may store the first data and the first data may not be flushed to the object store 140A.

In an example, a user application may send a read access call (block 418) and a gateway may receive the read access call (block 420). For example, the user application 152A may send a read access call for data and the gateway 120A may receive the read access call. For example, the read access call may be reading texts or documents stored in the filesystem such that the texts or documents can be retrieved and served to the user application 152A. In an example, the gateway may check whether the data is stored in the block store or whether it is stored in the object store. If it is determined that it is stored in the object store, the gateway may determine whether an object for the data in the object store is modified (block 422). For example, the gateway 120A may determine whether the object for which the read access call was sent is modified. If the object was modified, the gateway may determine whether it is safe to retrieve the object (block 424). If it is safe, the gateway may retrieve the object (block 426). A block associated with the object may be retrieved from the block store (block 428). In an example, the modification to the object may be updated to the block stores or the gateways across the compute zones. The object may be retrieved from the object store (block 430). Then, the object may be retrieved and served to the user application (block 432). In an example, the gateway may determine that it is safe to retrieve the object if the metadata or cache data related to the object have been updated and/or replicated to other gateways and block stores across the compute zones. If it is not safe, the gateway may determine not to retrieve the object. In an example, the gateway may delay the retrieval of the object until it becomes safe (e.g., the modification is updated to block stores or gateways across the compute zones).

In an example, a user application may send a second write access call for second data (block 434). For example, the user application 152A may send a second write access call to store second data. For example, the second write access call may be writing text in a second document in user application 152A. Then, the gateway may determine that the block store exceeds a predetermined threshold capacity (block 436). For example, the predetermined threshold capacity may be eighty (80), ninety (90), or ninety-five (95) percent of the full capacity of the block store. In another example, the predetermined threshold capacity may be determined based on the size of the remaining free storage area. For example, if the remaining storage area is less than 100 MB, 500 MB, 1 GB, or 10 GB, the gateway determines that the predetermined threshold capacity is exceeded. In an example, the gateway may throttle the speed of processing the second write access call (block 438). For example, the gateway 120A may delay processing the second write access call for 1 second to allow other data to be flushed from the block store 130A to the object store 140A. If the threshold capacity is still exceeded, the gateway may expand the capacity of the block store (block 440) and the block store capacity may be expanded (block 442). In an example, the gateway may expand the block store capacity without throttling the speed of processing the second write access call. In an example, additional blocks may be added at a predetermined cost for a predetermined time period.

Figure 5:
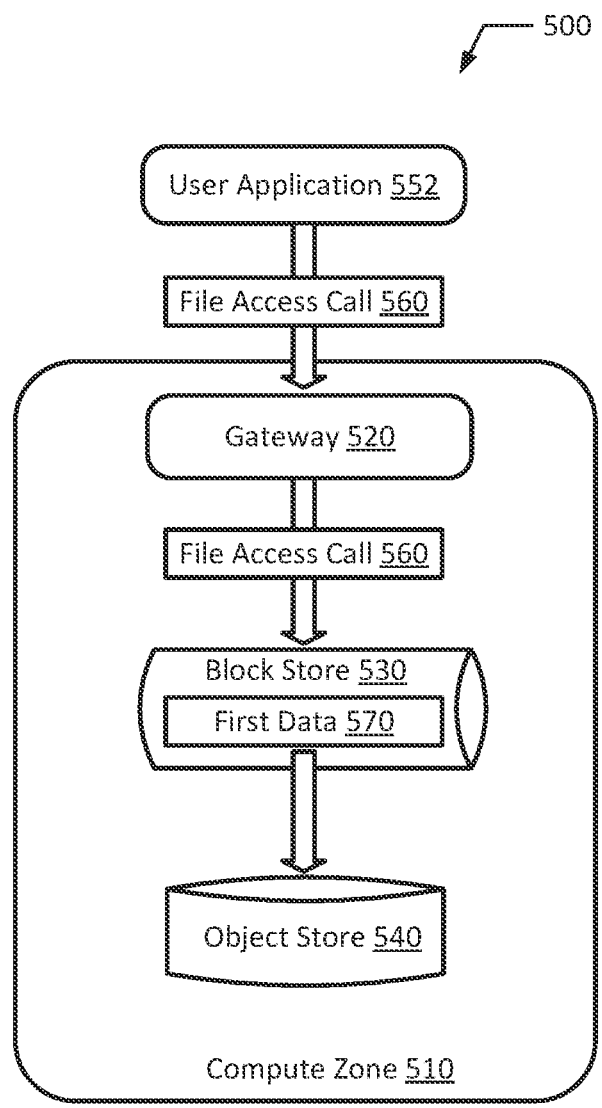
FIG. 5 is a block diagram of an example tiered cloud storage system according to an example of the present disclosure.

FIG. 5 shows a block diagram of an example tiered cloud storage system according to an example of the present disclosure. As illustrated in FIG. 5, an example system 500 may include a gateway 520, a block store 530, and an object store 540. The block store 530 may be configured to cache data. The object store 540 may be configured to persistently store data. The gateway 520, the block store 530, and the object store 540 may be in a compute zone 510. The system 500 may also include a user application 552. The gateway 520 may receive from the user application 552 a file access call 560. In an example, the file access call may be a write access call for first data 570. The gateway 520 may process the file access call 560 and send the file access call 560 to the block store 530. Then, the gateway 520 may determine to store the first data 570 in the object store 540 and flush the first data 570 from the block store 530 to the object store 540.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

The examples may be embodied in the form of computer-implemented processes and apparatuses for practicing those processes. An example may also be embodied in the form of a computer program code containing instructions embodied in tangible media, such as floppy diskettes, CD-ROMs, DVD-ROMs, hard drives, or any other computer readable non-transitory storage medium, wherein, when the computer program code is loaded into and executed by a computer, the computer becomes an apparatus for carrying out the method. An example may also be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
heuristically determining a frequency of replication for a cloud storage system based on prioritization of at least one of data consistency or data loss;
determining, in response to a write access call to store first data, by a first gateway in a first compute zone including a first block store and a first object store, that the first object store exceeds a predetermined threshold capacity;
responsive to determining that the first block store exceeds the predetermined threshold capacity, throttling, by the first gateway, a speed at which the first gateway processes the write access call to allow other data to be flushed from the first block store to the first object store, wherein the first object store has a flat and non-hierarchical structure; and
replicating metadata used by the first gateway at the frequency of replication to a second gateway in a second compute zone, the metadata comprising information regarding which data is stored in the first block store and which data is flushed to the first object store and stored in the first object store, wherein the second compute zone further includes a second block store and a second object store.

2. The method of claim 1, further comprising receiving, by the first gateway, from a user application the write access call.

3. The method of claim 1, further comprising replicating a data cache in the first block store at the frequency of replication to the second block store, wherein the data cache stores data cached in the first block store.

4. The method of claim 3, wherein at least one of the data cache and the metadata is replicated synchronously.

5. The method of claim 3, wherein both the data cache and the metadata are replicated asynchronously.

6. The method of claim 1, further comprising expanding, by the first gateway, a capacity of the first block store.

7. The method of claim 1, further comprising:
determining, by the first gateway, whether an object in the first object store is modified, wherein the object is associated with a block in the first block store; and
responsive to determining that the object is modified, determining, by the first gateway, whether it is safe to retrieve the object from the first object store.

8. The method of claim 7, further comprising: responsive to determining that it is not safe to retrieve the object from the first object store, delaying, by the first gateway, the retrieval of the object.

9. The method of claim 8, wherein the retrieval of the object is delayed until the modification of the object is updated to the second compute zone.

10. A cloud storage system comprising:
a first gateway;
a first block store; and
a first object store, wherein the first gateway, the first block store, and the first object store are in a first compute zone,
wherein the first gateway comprises one or more processors configured by executing computer instructions to:
heuristically determine a frequency of replication for the cloud storage system based on prioritization of at least one of data consistency or data loss;

determine, in response to a write access call to store first data, that the first object store exceeds a predetermined threshold capacity; and responsive to determining that the first block store exceeds the predetermined threshold capacity, throttle a speed at which the first gateway processes the write access call to allow other data to be flushed from the first block store to the first object store, wherein the first object store has a flat and non-hierarchical structure, wherein metadata used by the first gateway is replicated at the frequency of replication to a second gateway in a second compute zone, the metadata comprising information regarding which data is stored in the first block store and which data is flushed to the first object store and stored in the first object store, wherein the second compute zone further includes a second block store and a second object store.

11. The cloud storage system of claim 10, wherein the first gateway is a Portable Operating System Interface layer.

12. The cloud storage system of claim 10, wherein the first gateway is further configured to expand a capacity of the first block store.

13. The cloud storage system of claim 10, wherein a data cache in the first block store is replicated at the frequency of replication to the second block store, wherein the data cache stores data cached in the first block store.

14. The cloud storage system of claim 13, wherein at least one of the data cache and the metadata are replicated synchronously.

15. The cloud storage system of claim 13, wherein both the data cache and the metadata are replicated asynchronously.

16. The cloud storage system of claim 10, wherein the first gateway is further configured to:

determine whether an object in the first object store is modified, wherein the object is associated with a block in the first block store; and responsive to determining that the object is modified, determine whether it is safe to retrieve the object from the first object store.

17. The cloud storage system of claim 16, wherein the first gateway is further configured to: responsive to determining that it is not safe to retrieve the object from the first object store, delay the retrieval of the object.

18. The cloud storage system of claim 17, wherein the retrieval of the object is delayed until the modification of the object is updated to the second compute zone.

19. A computer readable, non-transitory storage medium including instructions that, when executed by one or more processors in a cloud storage system, cause the cloud storage system to:

heuristically determine a frequency of replication for the cloud storage system based on prioritization of at least one of data consistency or data loss;

determine, in response to a write access call to store first data, by a first gateway in a first compute zone including a first block store and a first object store, that the first object store exceeds a predetermined threshold capacity; and responsive to determining that the first block store exceeds the predetermined threshold capacity, throttle, by the first gateway, a speed at which the first gateway processes the write access call to allow other data to be flushed from the first block store to the first object store, wherein the first object store has a flat and non-hierarchical structure, wherein metadata used by the first gateway is replicated at the frequency of replication to a second gateway in a second compute zone, the metadata comprising information regarding which data is stored in the first block store and which data is flushed to the first object store and stored in the first object store, wherein the second compute zone further includes a second block store and a second object store.

20. The computer readable, non-transitory storage medium of claim 19, wherein a data cache in the first block store is replicated at the frequency of replication to the second block store, wherein the data cache stores data cached in the first block store.

* * * * *